United States Patent [19]

Culberson

[11] Patent Number: 4,912,381
[45] Date of Patent: Mar. 27, 1990

[54] ADAPTIVE CONTROL SYSTEM
[75] Inventor: Wayne T. Culberson, Pulaski, Va.
[73] Assignee: Kollmorgen Corporation, Simsbury, Conn.
[21] Appl. No.: 141,260
[22] Filed: Jan. 6, 1988

Related U.S. Application Data

[62] Division of Ser. No. 739,688, May 31, 1985, Pat. No. 4,733,149.

[51] Int. Cl.[4] .............................................. A01A 00/00
[52] U.S. Cl. ................................................... 318/561
[58] Field of Search ................ 318/561; 364/148, 157

[56] References Cited
U.S. PATENT DOCUMENTS

| | | | |
|---|---|---|---|
| 3,221,238 | 11/1965 | Unger et al. | 318/561 |
| 3,412,299 | 11/1968 | Buscher et al. | 318/561 |
| 4,460,968 | 7/1984 | Cavill et al. | 318/561 X |
| 4,498,037 | 2/1985 | Razavi | 318/561 |
| 4,540,923 | 9/1985 | Kade et al. | 318/561 |
| 4,695,780 | 9/1987 | Kurakake et al. | 318/561 |

FOREIGN PATENT DOCUMENTS

| | | | |
|---|---|---|---|
| 2742153 | 3/1979 | Fed. Rep. of Germany | 318/561 |
| 58-92004 | 6/1983 | Japan | 318/561 |
| 1197618 | 7/1970 | United Kingdom | 318/561 |
| 1413791 | 11/1975 | United Kingdom | 318/561 |
| 1436758 | 5/1976 | United Kingdom | 318/561 |

OTHER PUBLICATIONS

Phelan, Richard M., "Automatic Control System", Ithaca and London, Cornell University Press, 1977, pp. 124–201.
Weihrich and Wohld, "Adaptive Speed Control of D.C. Drives Using Adaptive Observers", 1980, pp. 283–287.
Landua, Yoan D., "Adaptive Control", Copyright 1977.

Primary Examiner—Bentsu Ro
Attorney, Agent, or Firm—Morgan & Finnegan

[57] ABSTRACT

A real time adaptive control capable of maintaining stable operation with changing inertia. The controller utilizes a pseudo-derivative feedback (PDF) type control wherein dynamic adjustment is achieved by adjusting only a single variable. The variable can be controlled as a function of the derivation of motor speed divided by motor current for adaptive control with changing inertia. Control may also be achieved as a function of motor speed divided by the integral of motor current over the same interval. In a digital implementation the integral of motor current the time required for a predetermined speed change provides effective control.

10 Claims, 6 Drawing Sheets

ADAPTIVE CONTROL SYSTEM

This is a divisional of co-pending application Ser. No. 739,688 filed May 31, 1985, now U.S. Pat. No. 4,733,149.

This invention relates to electrical control systems, and more particularly, to real time adaptive control systems. Although the invention is described primarily as a velocity controller for an electric motor, the invention has broad applications to adaptive control in general.

BACKGROUND OF THE INVENTION

A control system consists of a controller, control elements, and controlled elements. In a typical velocity servo system, the control elements can be power transistors or SCR's, the controlled elements are usually an electric motor coupled to a load, and the controller compares a velocity command to a velocity feedback to derive a velocity error signal used to drive the power transistors or SCR's. Both dynamic and static parameters are associated with each section of the control system and these parameters must be properly matched to obtain optimum performance and to avoid instability problems. In most systems, the parameters of the controller are set to "compensate" for parameters of the controlled elements.

The conventional controller configuration found in most velocity servo systems is PID (proportion, integral with derivative feedback). Compensation is achieved by adjusting four components which are the integrating and differentiating capacitors and their respective series resistors. Unfortunately, the four adjustable parameters are interrelated and are normally set for a particular load condition though a trial and error procedure. In cases where load conditions are fixed, the optimum compensation can be fixed. On the other hand, where the load or plant conditions vary, such as in a robotics system, the compensation must be set for either the worst case conditions, or at a compromise setting. Pre-set compensations cannot achieve optimum performance for all load variations, and, hence, the system operates at below optimum performance at least part of the time.

Adaptive control concepts are known, but have not previously been practical. In adaptive systems, the controller senses the load conditions and automatically adjusts the controller compensation accordingly. Although the concept is simple, the implementation has proven to be impractical. To adjust multiple interrelated controller parameters according to dynamically varying load parameters requires complex modeling of system characteristics and an inordinate number of iterative calculations. Even relatively simple control systems in the past have required large size dedicated computers if there was to be any realistic hope of achieving real time adaptive control.

SUMMARY OF THE INVENTION

Surprisingly, the controller according to the invention is able to achieve real time adaptive control using either a inexpensive single chip microcomputer or a relatively simple assemblage of analog computing elements.

Instead of using the conventional integral plus derivative feedback (PID) configuration in the controller, a pseudo-derivative feedback (PDF) control loop is utilized. The PDF control loop requires an increase in the number of operational amplifiers, but has the advantage of only requiring integration and not differentiation. More important, the PDF arrangement reduces the compensation adjustments to two variables, one of which is insensitive to dynamic load variations. Thus, only one variable need be adjusted according to dynamic load variations which is the integration proportioning factor referred as $K_i$.

The value of $K_i$ can be easily calculated from measured values of speed and motor current to correctly compensate for variations in the system inertia and motor/tachometer characteristics. Both speed and motor current are readily measureable parameters and, hence, permit construction of a practical adaptive control system.

More specifically, the parameter $K_i$ is a function of the derivative of motor speed ($\dot{W}$) divided by motor current ($I_m$). The tachometer feedback signal representing motor speed can easily be differentiated, but this approach presents practical problems due to the noise normally present on the signal. These problems are eliminated by using an equivalent equation wherein $K_i$ is a function of the change in motor speed divided by the integral of motor current over the same time interval. The measurements, calculations and compensation can all be achieved more rapidly than the normally expected changes in the controlled elements and, therefore, the adaptive control system according to the invention can be said to operate in real time.

Although analog implementations are disclosed, the preferred embodiment of the real time adaptive control is based on digital control. Rather than use a fixed time interval for measuring the change of speed and the integral of the motor current, a predetermined speed change is used. In other words, the system determines the length of time for a predetermined speed change to take place and integrates motor current over that same time interval. Since the speed change is always the same for each such calculation, the coefficient $K_i$ in the controller is adjusted as a function of the integral of the motor current.

BRIEF DESCRIPTION OF THE DRAWINGS

The objects of the invention are achieved a set forth in the illustrative embodiments shown in the drawings which form a part of the specification.

DETAILED DESCRIPTION OF THE INVENTION

Figure 1A:
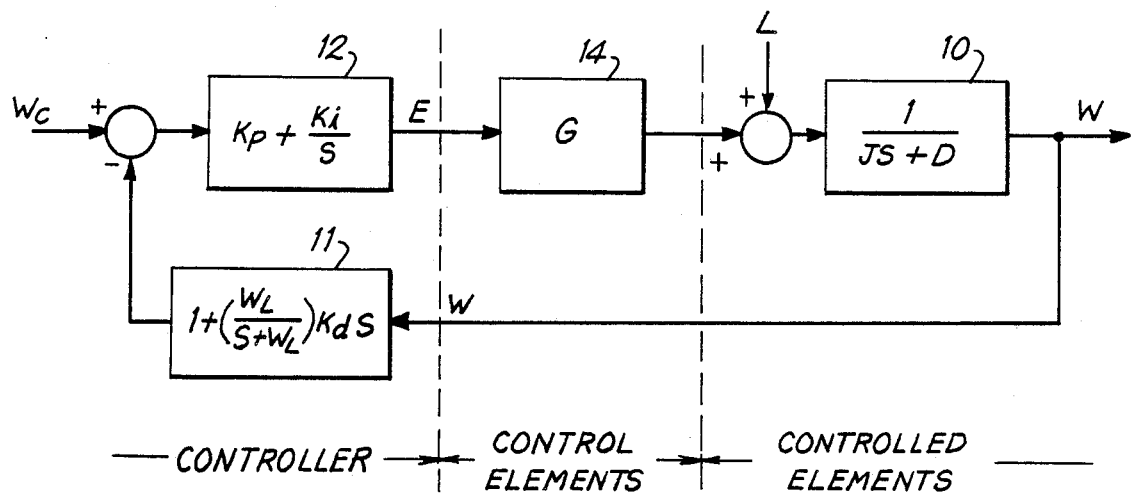
FIGS. 1A and 1B are a block diagram and a schematic diagram, respectively, illustrating a PID control system commonly used in the prior art.
Figure 1B:
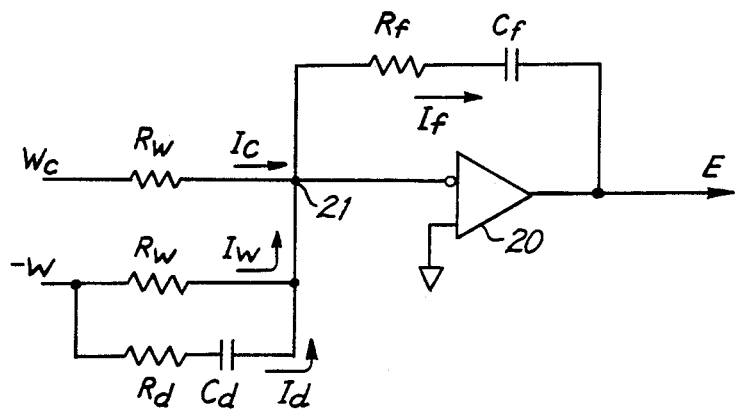

For comparison purposes, a simplified illustration of a PID (proportional, integral, derivitive-feedback) control system is illustrated in FIGS. 1A and 1B. In the functional block diagram, FIG. 1A, the basic elements of the system are the controlled elements 10, the controller which includes blocks 11 and 12 and the control elements 14. The forward loop of the controller includes the proportion coefficient $K_p$ and an integration coefficient $K_i/S$, wherein $1/S$ is the integral operator. The feedback loop includes the differential coefficient $K_dS$, the term S being the differential operator.

If it is assumed that FIG. 1A is a velocity motor control system, the control elements 14 could be a conventional transistor drive amplifier and the controlled elements 10 would include the motor connected to its load. The motor speed is W, the velocity command is $W_c$ and the controller output signal is E. The inertia of the motor and load is J and the damping action thereof is D. In most cases D is negligible and can be ignored.

The equation for the controller output (assuming the damping factor D is negligible) can be written:

$$E = (W_c - W)(K_p + K_i/S) - W(W_LS + W_L)(K_dK_pS + K_dK_i) \quad (1)$$

The transfer function (assuming gain G=1, derivative feedback $R_d=0$, and $W_L$ is infinite indicating no low frequency cutoff) can be written:

$$(J + K_dK_p)S^2W + (K_dK_i + K_p)SW + K_iW = K_iW_c + K_pSW_c \quad (2)$$

Comparing the homogenous equation to the standard second order constant coefficient differential equation:

$$S^2W + 2r\,W_nSW + W_n^2W = 0 \quad (3)$$

The natural frequency for the system is:

$$W_n = \sqrt{\frac{K_i}{J + K_dK_p}} \quad (4)$$

The damping ratio for the system is:

$$r = \frac{K_dK_i + K_p}{2\sqrt{K_i(J + K_dK_p)}} \quad (5)$$

A typical implementation of a PID controller is shown in FIG. 1B using an operational amplifier 20. The velocity command signal $W_c$ and the tachometer feedback signal W are coupled to the amplifier summing junction 21 via the input resistors $R_w$. The derivitive feedback is achieved by means of a resistor $R_d$ in series with a capacitor $C_d$, and this series combination is connected in parallel with feedback resistor $R_w$. The amplifier feedback includes capacitor C, in series with a resistor R, to provide the integration and proportioning.

The following equations can define the operations within the controller:

$$E = I_fZ_f \quad (6A)$$

$$Z_f = R_f + 1/SC_f \quad (6B)$$

$$I_f = I_c + I_w + I_d \quad (6C)$$

$$I_c = W_c/R_w \quad (6D)$$

$$I_w = -W/R_w \quad (6E)$$

$$I_d = \frac{-W}{R_d + 1/SC_d} = \frac{-C_dSW}{1 + SC_dR_d} \quad (6F)$$

These equations can be combined to define the control signal as follows:

$$\begin{aligned} E &= \left(\frac{W_c}{R_w} - \frac{W}{R_W} - \frac{C_dSW}{1+SC_dR_d}\right)\left(R_f + \frac{1}{SC_f}\right) \\ &= (W_c - W)\left(\frac{R_f}{R_W} + \frac{1}{SC_fR_W}\right) - \\ &\quad W\frac{1/C_dR_d}{S + 1/C_dR_d}\left(SC_dR_f + \frac{C_d}{C_f}\right) \end{aligned} \quad (7)$$

By equating terms with the block diagram (equation (1)), the coefficients of the block diagram in terms of component values in the schematic diagram are as follows:

$$K_p = R_f/R_w \quad (8A)$$

$$K_i = 1/C_fR_w \quad (8B)$$

$$K_d = C_dR_w \quad (8C)$$

$$W_L = 1/C_dR_d \quad (8D)$$

By adjusting the four variables, $R_f$, $C_f$, $R_d$ and $C_d$, the controller can be matched to the motor and load and compensated with the desired damping. In practice, compensation is achieved through trial and error adjustment of the four variables due to their interrelationship.

Richard M. Phelan in his book, "Automatic Control Systems," Cornell University Press, 1977, in chapter 4 describes a pseudo-derivitive feedback (PDF) control which in most cases can be utilized in place of a PID controller shown in FIG. 1. Phelan notes that in the PID system the derivitive feedback component is subsequently passed through an integrator in the forward loop. Since there is little point in taking a derivitive of a term and then immediately integrating it to obtain the initial value, a controller is proposed wherein the feedback is summed prior to integration without a proportional gain and is also summed after integration with a proportional gain. Since the derivitive is not actually formed in the controller, but the system functions as though it were, this controller is referred to as pseudo-derivitive feedback or PDF. One of the benefits derived from the PDF control is that the co-efficients $K_i$ and $K_d$ are separated and do not appear as a product as is the case in a PID type system. Also, the coefficient $K_p$ is eliminated.

Surprisingly, in evaluating controllers for adaptive control, it has been found that $K_d$ in the PDF system can be treated as a constant since it does not require adjustment according to load variations or changes in the controlled equipment. Also, it has been found that the coefficient $K_i$ can be controlled dynamically as a function of the motor speed and the motor current. Both motor speed and motor current are readily measureable quantities and, in fact, are normally measured or sensed in most electric motor servo control systems. Therefore, by arranging a PDF type controller so that $K_i$ can be adjusted automatically as a function of motor current and motor speed, a practical adaptive controller is achieved which automatically compensates for changing conditions of the load or controlled elements.

Figure 2:
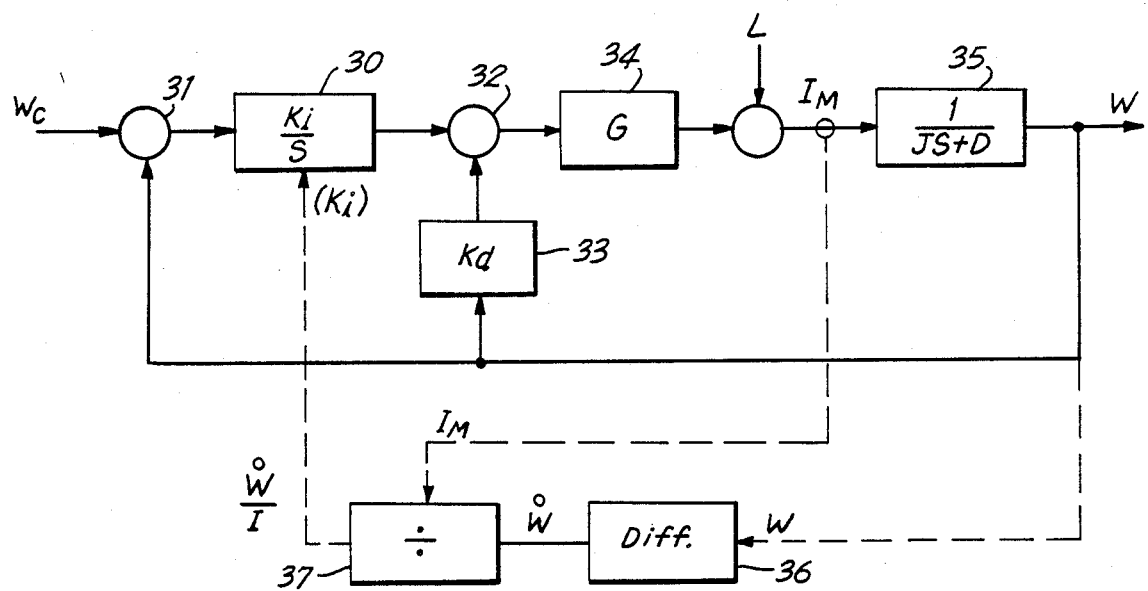
FIG. 2 is a functional block diagram illustrating one embodiment of the adaptive control system according to the invention.

A functional block diagram for the adaptive controller according to the invention is shown in FIG. 2. Integration $K_i/S$ is performed in block 30 without proportioning. The velocity feedback is summed with the velocity command at summing point 31 prior to the integration and the velocity feedback proportioned by the coefficient $K_d$ in block 33 is summed at summing point 32 after the integration to determine the control signal E. The control signal drives the control elements which, in turn, drive the controlled elements 35. In the case of a motor velocity control system, the controlled elements would include the motor coupled to a load (inertia J) which rotates at speed W.

The transfer function for the controller in FIG. 2 (assuming G=1 and 0 is neqlible) is:

$$JS^2W + K_dSW + K_iW = K_iW_c \quad (9)$$

The natural frequency is:

$$W_N = \sqrt{K_i/J} \quad (10)$$

The damping ratio is:

$$r = K_d/2 \sqrt{K_i/J} \quad (11)$$

The constant $K_i$ for a critically damped system can be calculated as:

$$K_i = K_d^2/4J \quad (12)$$

The coefficient $K_d$ can be calculated as:

$$K_d = 5.44 \frac{Torque_{max}}{W_{o,\ max-linear}} \quad (13)$$

In equation 13, $Torque_{max}$ reflects that there are physical limitations in any systems and $W_{o,\ max-linear}$ is the maximum step change in the velocity command which will still cause linear operation. In reality, $K_d$ is limited only by system noise; the limit is not a function of maximum torque. Therefore, $K_d$ is set at some reasonable value below a noise limit and need not be changed according to load variations or changes in the motor/tachometer equipment.

Equation (12) is for a critically damped system where the damping ratio is 1. If the damping ratio is other than 1, then the equation for $K_i$ becomes:

$$K_i = K_d^2/4Jr^2 \quad (14)$$

The value of $K_i$ is thus increased for underdamped operations and decreased for overdamped operations. Stiffness and bandwidth can also be increased by increasing $K_i$.

The dynamic variable in $K_i$ is principally the inertia J which changes with load variations. Inertia an be expressed:

$$J\dot{W} = K_T I \quad (15)$$

where I is the motor current and W is the derivitive of motor speed. Thus, the coefficient $K_i$ can be expressed:

$$K_i = K_{d2}\dot{W}/4K_T I \quad (16)$$

Since $K_d$ and $K_T$ are constants:

$$K_i = K\dot{W}/I \quad (17)$$

Thus, K is a scaling factor which is set by design for the desired degree of damping, stiffness and bandwidth. $K_i$ is then dynamically controlled according to the derivitive of speed divided by current (or the equivalent thereof) to achieve real-time adaptive control according to load variations. As shown in the functional block diagram of FIG. 2, the speed W is differentiated in block 36 and is then divided by motor current $I_m$ in divider 37 to derive the dynamic control for the coefficient $K_i$ in integrator 30.

Figure 3:
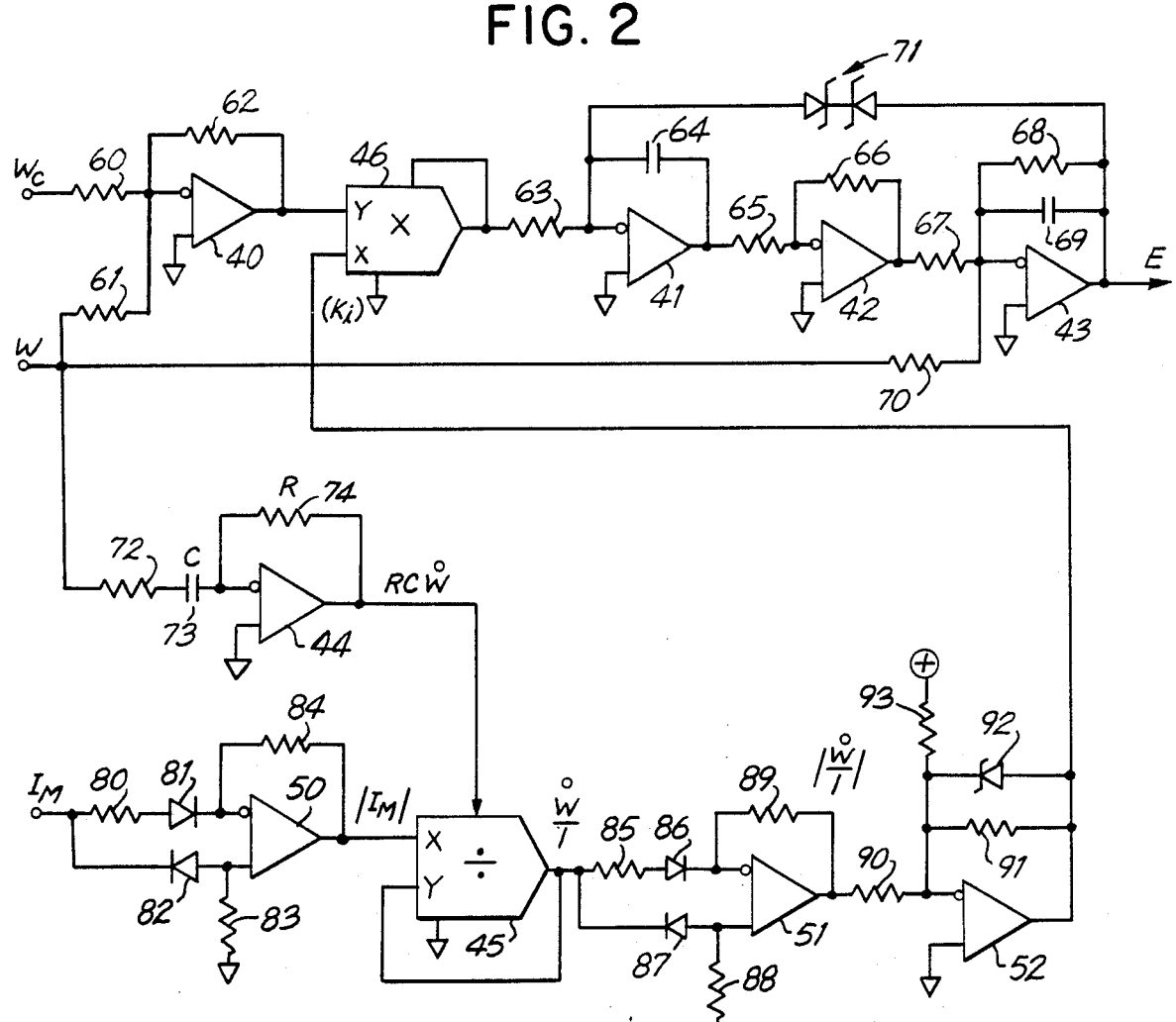
FIG. 3 is an analog implementation of the adaptive controller illustrated in FIG. 2.

FIG. 3 is a schematic diagram of an analog implementation for the system shown as a functional block diagram in FIG. 2. The controller includes operational amplifiers 40-43. Operational amplifier 44 is used to obtain the derivitive of motor speed which is divided by motor current in divider 45 to control the coefficient $K_i$ in the controller via multiplier 46.

More specifically, the controller includes operational amplifier 40 with a resistive feedback 62 to provide as a summing circuit. The velocity command $W_c$ is coupled to the summing junction via an input resistor 60 and the velocity feedback W is also coupled to the summing junction via an input resistor 61.

Circuit 46 is connected to form a multiplier which controls the coefficient $K_i$ in the controller. The output of amplifier 40 is connected to the y input of the multiplier.

Capacitator 64 provides feedback for operational amplifier 41 which operates as an integrator. The output of multiplier 46 is coupled to the summing junction of amplifier 41 through an input resistor 63. Operational amplifier 42 operates as an invertor including resistor 66 as an amplifier feedback and a resistor 65 between the output of amplifier 41 and the summing junction.

Operational amplifier 43 includes resistive feedback 68 and operates as a summing circuit. The output of amplifier 42 is coupled to the summing junction via input resistor 67 and the velocity feedback signal W is coupled to the summing junction via input resistor 70. A small capacitor 69 is connected across resistor 68 to provide high frequency filtering. A pair of back to back Zener diodes 71 are connected between the output of amplifier 43 and the summing junction of amplifier 41. These diodes provide clamping so that the controller cannot call for conditions beyond the capability of the control elements.

Operational amplifier 44 is connected to operate as a differentiating circuit to obtain the derivitive of velocity W. The velocity feedback signal W is supplied to the summing junction of operational amplifier 44 through a resistor 72 in series with a capacitor 73. A resistor 74 is connected across the amplifier to provide the operational feedback. The output of amplifier 44 supplies the speed derivitive signal to circuit 45 connected in a divider configuration.

The motor current signal is supplied to the x input of divider 45 through operational amplifier 50 which supplies the absolute value of the motor current to the divider input. The motor current signal $I_m$ is supplied to the anode of a diode 81 through a resistor 80, and the cathode of the diode is in turn coupled to the inverting input of operational amplifier 50. The motor current is also supplied to the cathode of a diode 82 having its anode connected to the non inverting input of the amplifier. A resistor 84 provides resistive feedback to the inverting input and a resistor 83 couples the non inverting input to ground.

The output of divider circuit 45 is the speed derivitive divided by motor current which passes through operational amplifier 51 to provide the absolute value thereof and then through an operational amplifier 52 which functions as an inverter and a clamp to limit the maximum signal. More specifically, the output of divider 45 is coupled to the inverting input of amplifier 51 via resistor 85 in series with diode 86, and is also connected to the non inverting input via a diode 87 poled in the opposite direction. Resistor 89 provides feedback to the inverting input and resistor 88 couples the non inverting input to ground. The absolute value of the speed derivitive divided by current which appears at the output of amplifier 51 is coupled to the summing junction of operational amplifier 52 via an input resistor 90. Resistor 91 provides resistive feedback for amplifier 52. Zener diode 92 is connected in parallel with feedback resistor 91 to limit the maximum output of amplifier 52. A resistor 93 is coupled between a positive source and the summing junction to provide current flow for biasing the output to a minimum level.

When the controller is in operation, amplifier 41 functions as the integrating circuit. Amplifier 40 sums the velocity signal W with the velocity command $W_c$ prior to the integration, and amplifier 43 functions as a summing circuit to sum the integrated signal with the velocity feedback following the integration. The values for resistors 68 and 70 provide proportioning in accordance with coefficient $K_d$. Multiplier 46 controls the gain of the forward loop through the integrator and thus adjusts the controller in accordance with the coefficient $K_i$. Coefficient $K_i$ is adaptively controlled in accordance with the derivitive of velocity obtained through amplifier 44 divided by motor current in divider 45. It is important that the adaptive controller not call for conditions beyond the capacity of the control elements to supply the motor. The Zener diode values for diodes 71 and 92 are selected to provide the appropriate limits.

Although the velocity signal can easily be differentiated (block 36 in FIG. 2; operational amplifier 44 in FIG. 3), noise present on the velocity signal normally obtained from tachometer creates errors in the derivitive value. For cases where the velocity signal tends to be noisy, the equation (17) for $K_i$, is preferably re-written as follows:

$$K_i = K \frac{\int_{t2}^{t2} Wdt}{\int_{t1}^{t2} Idt} = \frac{W_{t2} - W_{t1}}{\int_{t1}^{t2} Idt} \quad (18)$$

Thus, the coefficient $K_i$, can be controlled as a function of the change in speed divided by the integral of motor current. This adaptive control arrangement is illustrated functionally in FIG. 4.

The controller 30–35 is the same as previously described in FIG. 2. Block 100 determines the change in velocity over a particular time interval, whereas an integrator 102 integrates the motor current over the same time interval. The change of speed is divided by the integral of motor current in divider 104, and the result is used to control the coefficient $K_i$, in the controller block 30.

Figure 4:
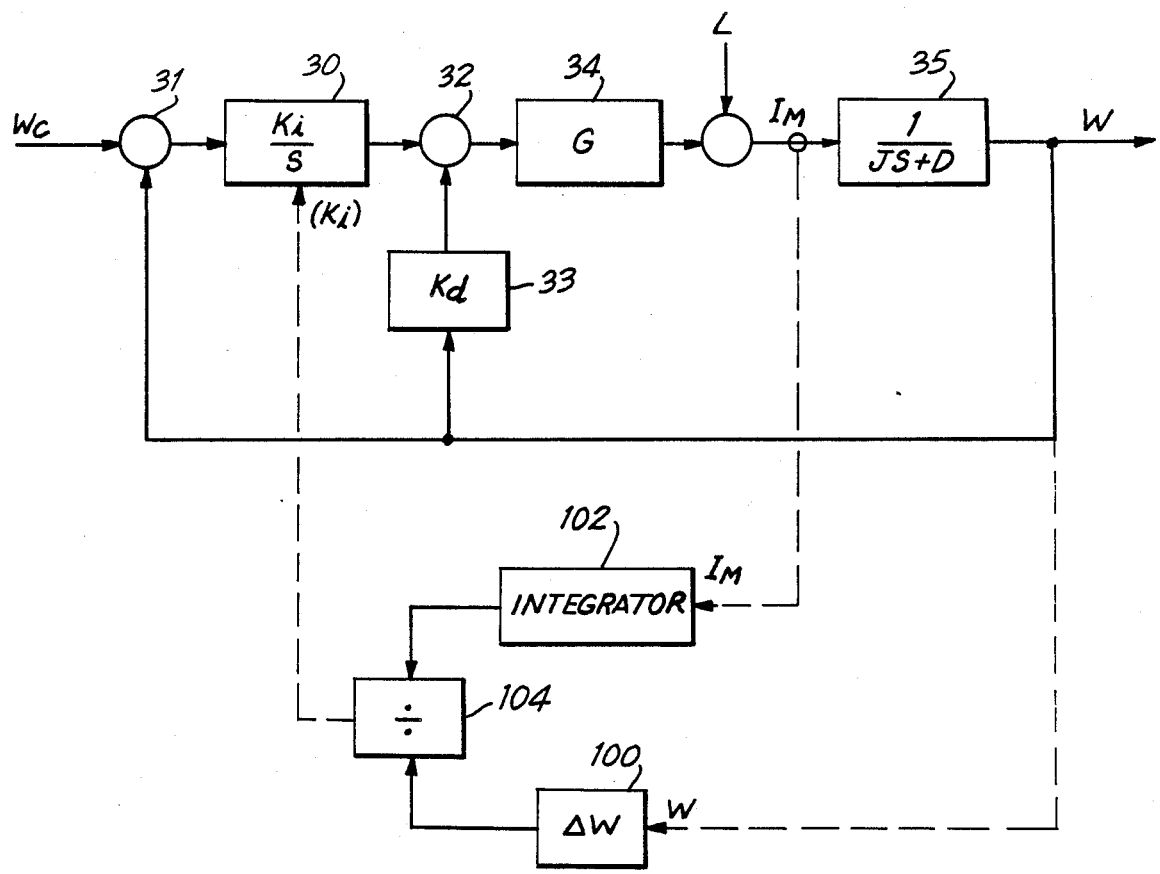
FIG. 4 is a functional block diagram of another embodiment of the adaptive control system according to the invention.
Figure 5:
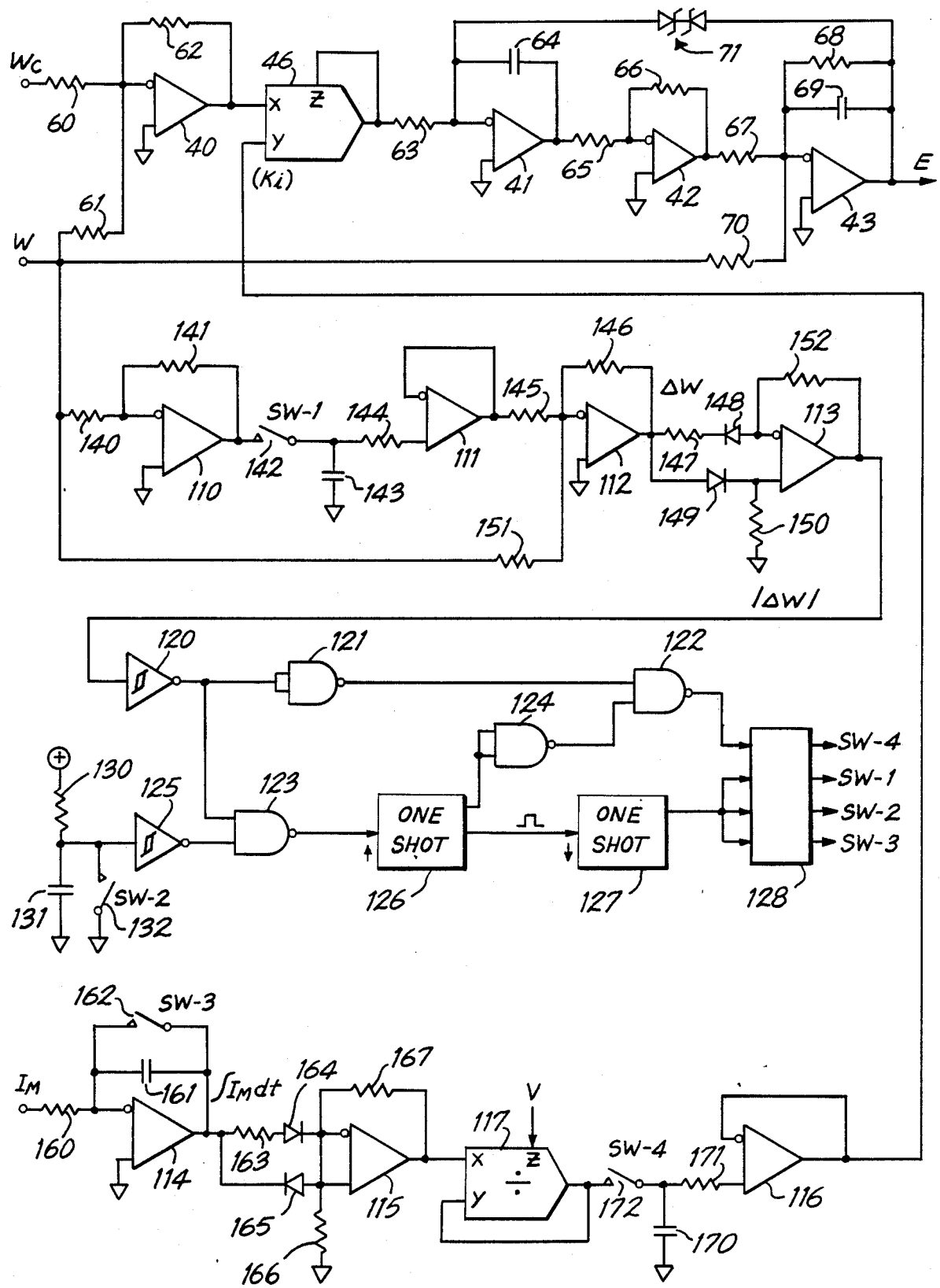
FIG. 5 is an analog implementation of the controller illustrated in FIG. 4.
Figure 6:
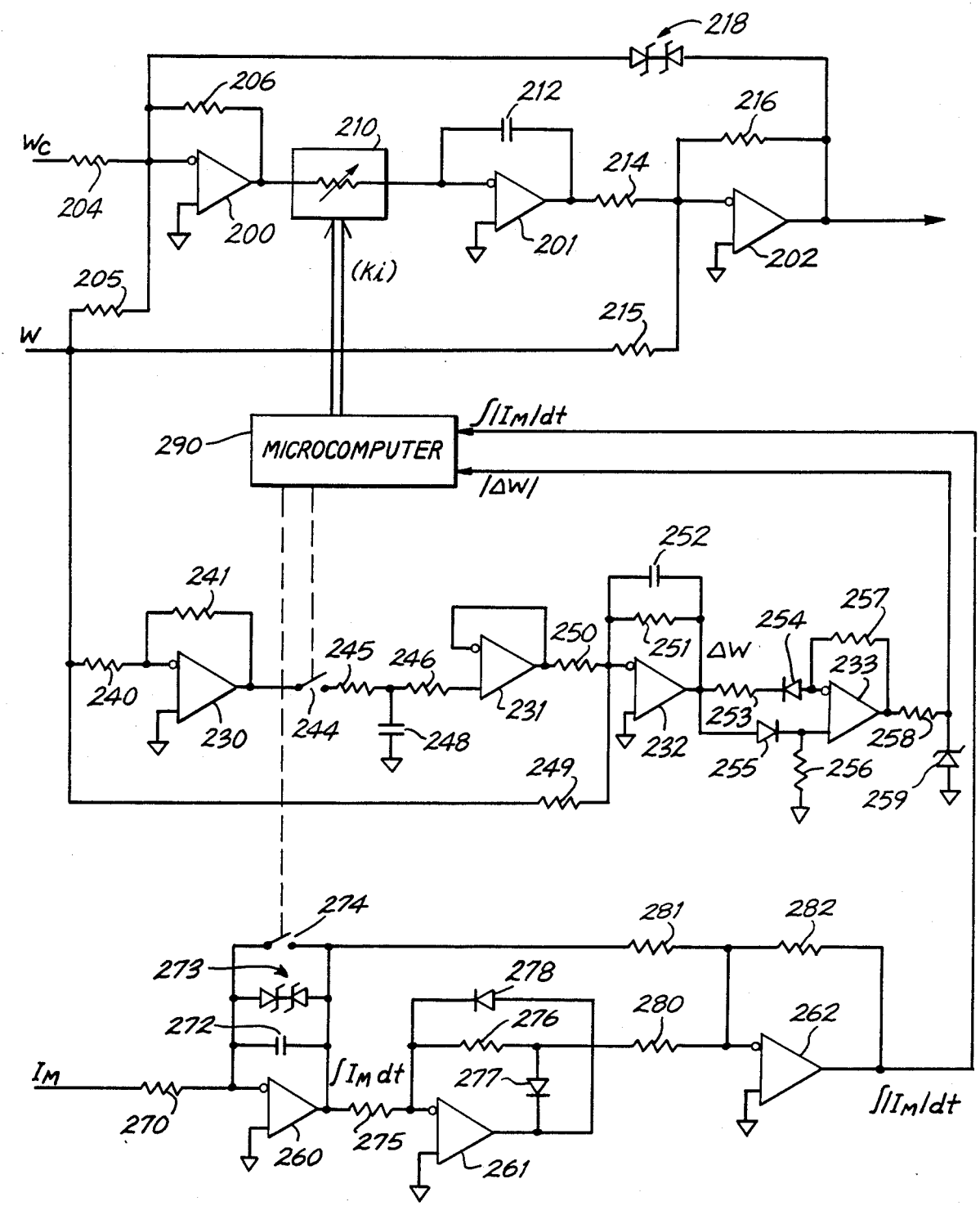
FIG. 6 is a digitally controlled implementation of the controller according to FIG. 4.
Figure 7:
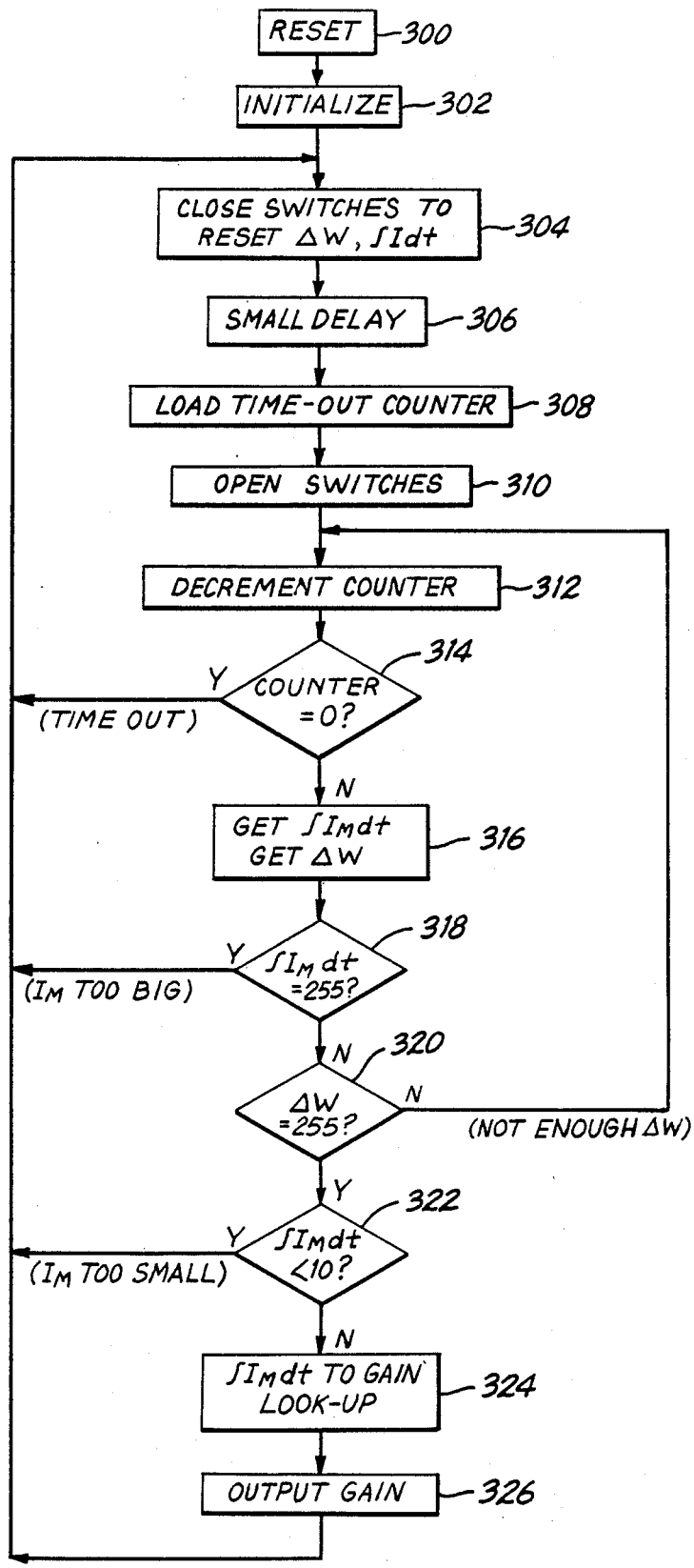
FIG. 7 is a flow diagram illustrating the program for the microcomputer in the controller shown in FIG. 6.

The adaptive control system in FIG. 4 is shown as an analog implementation in FIG. 5 and as a digital controlled implementation in FIGS. 6 and 7. In these implementations, rather than calculate the change of velocity and the integral of current over a pre determined time interval, current is integrated over a time interval corresponding to a predetermined change in velocity. With this arrangement, the velocity change is the same for each sample for which an adjustment is made in the coefficient $K_i$, and, therefore, the coefficient $K_i$, can be directly controlled as a function of the integral of motor current.

In the analog implementation of FIG. 5, the controller includes elements 60–71, which are the same as corresponding elements previously described in FIG. 3. Operational amplifiers 110–113 provide a sample and hold circuit and provide a comparison of the then existing velocity with a prior initial velocity value. Operational amplifiers 114–116 provide the integral of motor current and hold the value for control of the coefficient $K_i$, via multiplier 46. Components 120–128 and 130–132 provide the timing control for operating the adaptive portion of the system.

More, specifically, Amplifier 110 functions as an inverter. The velocity signal is coupled to the inverting input of the amplifier through an input resistor 140 and a resistor 141 provides he amplifier feedback.

Amplifier 111 is connected to form a sample and hold circuit. The output of amplifier 110 is connected to the non inverting input of amplifier 111 via switch 142 (also designated SW-1) in series with an input resistor 144. The junction of switch 142 and resistor 144 is coupled to ground via a capacitor 143. Thus, when switch 142 is closed, the signal appearing at the output of amplifier 11 is developed across capacitor 143. Thereafter, when switch 142 is opened the capacitor maintains that signal at the input of the amplifier which, in turn, is reflected at the amplifier output.

Amplifier 112 is connected in the configuration of a summing circuit. The output of amplifier 111 is coupled to the summing junction through an input resistor 145 and the actual speed signal W is coupled to the same summing junction through an input resistor 151. Resistor 146 provides the amplifier feedback. Thus, the signal appearing at the output amplifier 112 represents the difference between the initial velocity signal being held on capacitor 143 compared to the then existinq actual velocity.

Amplifier 113 provides a signal representing the absolute value of the velocity change. The output of amplifier 112 is coupled to the inverting input of amplifier 113 through a resistor 147 in series with a diode 148 and the output of amplifier 112 is also connected to the noninverting input of amplifier 113 through a diode 149 poled in the opposite direction. A resistor 152 provides amplifier feedback and a resistor 150 couples the non-inverting input to ground. The signal appearing at the output of amplifier 113 represents the absolute value of the velocity change.

Operational amplifiers 114–116 together with divider circuit 117 integrate the motor current signal and hold the integral for control of the coefficient $K_i$, in the controller. Amplifier 114 is connected in a configuration to provide integration of the motor current. Integrating capacitor 161 is coupled across the amplifier to provide the feedback and the motor current is supplied to the amplifier summing junction through an input resistor 160. A switch 162 (also designated SW-3) is connected in parallel with the capacitor. When switch 162 is closed the capacitor is discharged to set a zero initial condition for the integrator. When switch 162 is opened, the capacitor changes in accordance with the applied motor current such that the motor current is integrated and the integral appears at the amplifier output.

Amplifier 115 provides the absolute value of the integral for the x input of divider 117. The output of amplifier 114 is connected to the inverting input of amplifier 115 through a resistor 163 in series with a diode 164, and the output of amplifier 114 is also connected to the non inverting input of amplifier 115 through a diode 165 poled in the opposite direction. Resistor 167 provides the amplifier feedback and a resistor 166 couples the noninverting input of the amplifier to ground.

Circuit 117 is configured to provide a divider such that the value r is divided by the output of amplifier 115 to provide appropriate scaling and to provide the reciprical of for the motor current integral.

Amplifier 116 provides a sample and hold circuit which maintains the integral signal for us in controlling the coefficient $K_i$ between sample intervals. More specifically, the output of divider 117 is coupled to the non inverting input of amplifier 116 through switch 172 (also designated SW-4) and a series input resistor 171. The junction between switch 172 and resistor 171 is connected to ground through a capacitor 170. When switch 172 is closed the signal appearing at the output of divider 117 appears across capacitor 170 and is thereafter maintained when the switch is open. Amplifier 116 maintains the signal across the capacitor at the amplifier output.

Components 120–128 and 130–132 provide the timing control for sampling intervals used in determining the adjustment for the coefficient $K_i$. The control permits operation until such time as the velocity changes by a predetermined amount. When the required velocity change is detected, the then existing reciprical value of the motor current integral with the appropriate scaling is transferred to capacitor 170 and maintained to adjust the coefficient $K_i$. More specifically, the absolute value of the velocity change which appears at the output of amplifier 113 is coupled to a threshold trigger circuit 120 which provides an output signal when the threshold value has been exceeded. The output of circuit 120 passes through an inverter circuit 121 to one input of a NAND circuit 122. The output of circuit 120 is also supplied to a NOR circuit 123 which provides an OR logic function and the output of the circuit 123 is supplied to a one shot circuit 126. The output of the one shot circuit is coupled to the other input of NAND circuit 122 through an inverter 124. The output of NAND circuit 122 is supplied to a drive amplifier for switch SW-4 in circuit 128. Thus, when the change in velocity exceeds the threshold of trigger circuit 120, the output signal conditions NAND circuit 122 and initiates a pulse by means of one-shot circuit 126 which then passes through the conditioned NAND gate to momentarily close the switch SW-4 (switch 172) for the duration of the pulse from one-shot circuit 126.

The complimentary output of one shot circuit 126 is coupled to a one-shot circuit 127 configured to trigger on the trailing edge of the applied input pulse. The output of one-shot circuit 127 is supplied to three drive amplifiers in circuit 128 which, in turn, close the switches SW-1, SW-2, and SW-3. One shot circuit 127 provides an output pulse immediately following the output pulse supplied by one shot circuit 126 and the pulse supplied to circuit 128 momentarily closes the switches SW-1, SW-2 and SW-3 for the duration of the pulse. Momentary closure of switches SW-1, SW-2 and SW-3 resets the control system for a new sampling interval. Switch SW-1 transfers a new initial velocity value to capaciter 143, switch SW-2 discharges capacitor 131 to reset the timer, and switch SW-3 discharges integrating capacitor 161 to reset the integrater to a zero initial condition.

A threshold trigger circuit 125 is connected to provide a timer such that the adjustment of coefficient $K_i$ will not be made when there is insufficient change in the motor velocity. The timer includes a resistor 130 connected in series with a capacitor 131 between a positive source and ground. The junction between resistor 130 and capacitor 131 is connected to the input of threshold trigger circuit 125 and a switch 132 (also designator SW-2) is connected across the capacitor 131. When switch 132 is closed, the capacitor is discharged. When switch 132 is open, the capacitor charges according to current flowing through resistor 130 and, when the potential across the capacitor exceeds the threshold value of circuit 125, an output signal is provided to an input of circuit 123.

If the velocity change does not exceed the threshold of circuit 120 by the time the timer circuit exceeds the threshold of circuit 125, a signal passes through circuit 123 to trigger one-shot circuit 126 which in turn triggers one-shot circuit 127 to momentarily close switches SW-1 through SW-3, thereby resetting the control system for a new sampling interval. Since NAND gate 122 has not been conditioned, i.e. there has not been sufficient velocity change, switch SW-4 is not closed and therefore a new current integral signal is not transferred to capacitor 170 to effect adjustment of coefficient $K_i$.

Accordingly, when the adaptive controller is in operation, the adaptive control circuit provides repetitive sample intervals during which the change in velocity is monitored. If the change in velocity reaches a predetermined value, the integral of motor current for that sample period is utilized to adjust the coefficient $K_i$.

FIG. 6 is another implementation of the control system shown in FIG. 4, in this case using a microcomputer to control the adaptive portion of the system. The coefficient $K_i$ in the controller is adjusted as a function of the integral of motor current integrated over a sample interval as required to achieve a predetermined change in motor velocity. The microcomputer initiates the sample interval and then monitors the change in motor velocity as well as the integral of motor current. When the change in velocity reaches a predetermined value, coefficient $K_i$ is adjusted according to the then existing integral value of motor current. The microcomputer is programmed to reject data from sample intervals (1) if the change in velocity does not reach a predetermined value within a maximum time interval and (2) if the motor current integral is out of range by being either too low or too high.

Operational amplifiers 200–202 form a PDF controller. Operational amplifier 201 includes a capacitative feedback 212 and therefore functions as an integrator in the forward loop of the controller. Operational amplifier 200 provides a summing circuit for comparing the velocity command with the actual motor velocity. More specifically, the velocity command is supplied to the summing junction via an input resistor 204 and the actual motor velocity signal is supplied to the summing junction via an input resistor 205, resistive feedback for the amplifier being provided feedback resistor 206. The output of amplifier 200 is supplied to the summing junction of the integrator through a variable resistor 210 which is set under the control of a microcomputer 290 in accordance with the coefficient $k_1$. Operational amplifier 202 provides a summing circuit for summing the velocity signal with the integrated signal from amplifier 201. Specifically, the output of amplifier 201 is coupled to the summing junction associated with amplifier 202 through an input resistor 214 and the actual motor velocity signal is coupled to the summing junction via resistor 215, with resistor 216 providing resistive feedback for the amplifier. A pair of back-to-back Zener diodes 218 provide a voltage limiting clamp between the output of amplifier 202 and the summing junction of amplifier 200. Diodes 218 are selected to limit the controller output to values that can realistically be supplied by the control elements in controlling the motor.

Operational amplifiers 230-233 and related components 240-257 provide a signal indicating the change in motor velocity and are essentially the same as components 110-113 and 140-152 in FIG. 5. When switch 244 is closed, an initial value of velocity is transferred to capacitor 248 and held at the input of amplifier 231. When switch 244 is thereafter opened, the initial velocity value is compared to the actual velocity value in the summing circuit including amplifier 232 and the absolute value of the change of velocity appears at the output of amplifier 233.

The output of amplifier 233 is coupled to ground via a resistor 258 and a Zener diode 259.

The junction between resistor 258 and diode 259 is coupled to an analog-to-digital input port of the microcomputer.

Operational amplifiers 260-262 develop a signal indicating the absolute value of the integral of motor current. A capacitor 272 is connected as the feedback across amplifier 260 so that the circuit functions as an integrator. The motor current $I_m$ is supplied to the amplifier summing junction through an input resistor 270. Back-to-back Zener diodes 273 are connected across capacitor 272 to limit the integrator output to reasonable values. Switch 274 is also connected in parallel with integrating capacitor 272. When the switch is closed, the capacitor is discharged and reset to a zero initial value. When the switch is open, the capacitor may charge in accordance with the integral of the supplied motor current.

Amplifiers 261 and 262 are inter-connected to provide the absolute value of the motor current integral. The output of amplifier 260 is connected to the summing junction of amplifier 261 via an input resistor 275. A resistor 276 in series with a diode 277 is connected across amplifier 261 in parallel with a diode 278 poled in the opposite direction. The junction between resistor 276 and diode 277 is connected to the summing junction of amplifier 262 via an input resistor 280.

The output of amplifier 260 is also connected to the summing junction via input resistor 281. Resistor 282 provides resistive feedback for the amplifier. The output of amplifier 262, which represents the absolute value of the motor current integral, is supplied to an analog-to-digital input port of microcomputer 290.

In addition to controlling the value of variable resistor 210 in the controller, the microcomputer also controls the condition of switches 244 and 274 to control the sampling intervals. Variable resistor 210 which sets the value for $K_i$ in the controller is preferably in the form of individually switched fixed resistors which increase in value according to powers of two. The resistors are connectable in parallel and can be switched into the circuit either individually or in combination. With eight such switches and resistors, the variable resistor can be controlled by an 8-bit word output from the microcomputer to provide incremental step control over a range of 0 to 255.

A flow diagram for the microcomputer program is shown in FIG. 7. The computer is reset in step 300 and then initialized in step 302. Next, switches 244 and 274 in FIG. 6 are closed to reset the respective circuits for the change in velocity and integral of motor current. The computer provides a small delay in step 306 and then loads the time-out counter in step 308. The time-out counter is utilized to limit the maximum duration of a sample interval so that if a predetermined change of velocity is not achieved, the computer initiates a new sample interval. After the time-out counter has been set, the computer opens switches 244 and 274 to begin the sample interval.

The program enters the loop for monitoring the change in velocity and inteqal of motor current in step 312. The computer decrements the counter and then, in decision 314 determines if the counter is at zero. If the count is zero, the program returns to step 304 and initiates a new sample interval and, if not, continues to step 316. In step 316, the computer reads the values from the analog-to-digital input ports for the integral of motor current and the change of motor velocity. The computer next tests the data by first determining, in decision 318, whether the integral of current exceeds the maximum limit of 255. If it has, then the computer returns to step 304 to initiate a new sample interval. If not, the computer then determines whether the change in velocity is equal to the predetermined value 255. If not, the computer returns to step 312 and continues to cycle through steps 312-320. When the change in velocity is equal to 255, the computer goes on to decision 322.

In decision 322 the program determines if the integral of current is sufficently large (greater then 10) to be meaningful. If not, the program returns to step 304 to initiate a new sample interval. On the other hand, if the integral of motor current represents a valid reading, the computer progresses to step 324 to obtain an appropriate gain value for $K_i$, from a look-up table stored in the computer, The gain value is then passed to the computer output in step 326 to adjust the $K_i$, gain value by controlling variable resistor 210. The computer then returns to step 304 to initiate a new sample interval.

Although only few illustrative embodiments have been described in detail, there are obviously other embodiments within the scope of this invention. For controlling an electric motor the PDF controller is prefered since adaptive control can be achieved by adjusting a single coefficient. It is important that the adaptively controlled coefficients in the selected controller be independant and preferably as few as possible. The PDF type controller will normally be prefered whether or not an electric motor is being controlled, but other types of controllers may meet the requirements of having a limited number of preferably independant control coefficients. It is also important that the parameters of the controlled system used to achieve adaptive control of controller coefficients be readily measurable and few in number. In the control of a variable load electric motor system, adaptive control can be achieved according to changes in inertia of the load by controlling the controller coefficients as a function of motor current and motor speed. In systems not including electric motors, comparable parameters of the controlled system should be selected. The scope of the invention is more particularily defined in the appended claims.

What is claimed is:

1. A method for adaptive control in a system including a controller, control elements and controlled elements, comprising the steps of:
   providing a command signal for a controlled parameter;
   providing a feedback signal indicating the actual value of the controlled parameter;
   using a PDF controller including
     integration in a forward loop thereof,
     comparing said command signal and said feedback signal prior to said integration; and
     summing said feedback signal in said forward loop after said integration; and
   dynamically controlling the forward loop gain for said integration as a function of at least one measured parameter of the controlled system.

2. An adaptive control method according to claim 1 wherein said forward loop gain is the only dynamically controlled parameter in the controller.

3. An adaptive control method according to claim 1 wherein said controlled elements include an electric motor, said command signal is a velocity command and wherein said feedback signal indicates the actual velocity of said electric motor.

4. A method for adaptive control of a controller for an electric motor coupled to variable load comprising the steps of:
   providing a velocity command signal indicating a desired motor speed;
   providing a velocity feedback signal indicating the actual motor speed;
   using PDF control in the controller including
     integration in a forward loop to provide an integrated signal,
     comparing said velocity command signal and said velocity feedback signal prior to said integration,
     summing said integrated signal and said velocity feedback signal after said integration, and
     proportioning of said integrated signal; and
   controlling said proportioning of said integrated signal as a function of load variations.

5. An adaptive control system comprising:
   controlled elements;
   control elements for controlling said controlled elements;
   feedback means for providing a feedback signal indicating the actual value of a parameter of said controlled elements;
   command means providing a command signal indicating the desired value for said parameter being controlled;
   a PDF controller including
     an integrator in a forward loop to provide an integrated signal,
     a summing circuit for summing and comparing said command signal with said feedback signal to derive a signal supplied to said integrator,
     a second summing circuit for summing and comparing the integrated signal and said feedback signal, and
     means for setting the gain of the signal being integrated by said integrator; and
   adaptive control means coupled to said controlled elements and operative to adjust said means for setting the gain of the signal being integrated as a function of at least one measure parameter of said controlled elements.

6. An adaptive control system according to claim 5 wherein said controlled elements include an electric motor.

7. An adaptive control system according to claim 6 wherein said parameter being controlled is the velocity of said motor.

8. An adaptive control system according to claim 6 wherein said controlled elements include a variable inertia load for said motor and wherein said controller is compensated for said variable inertia load by adjustment of said means for settling the gain.

9. An adaptive control system for an electric motor coupled to a load, comprising:
   command means for providing a command signal indicating the desired value for an operating parameter of the motor;
   feedback means for providing a feedback signal indicating the actual value of said parameter of said motor;
   a PDF controller including
     an integrator in a forward loop to provide an integrated signal,
     a summing circuit for summing and comparing said command signal with said feedback signal to derive a signal supplied to said integrator,
     a second summing circuit for summing and comparing the integrated signal and said feedback signal, and
     means for proportioning the signal being integrated by said integrator;
   adaptive control means coupled to the motor and operative to adjust said means for proportioning as a function of at least one measured parameter of said motor coupled to said load.

10. An adaptive control system according to claim 9 wherein the motor is coupled to a variable load and wherein said means for proportioning is adjusted as a function of load inertia.

* * * * *